United States Patent Office 3,761,400
Patented Sept. 25, 1973

3,761,400
CATALYST REJUVENATION
David S. Mitchell, San Rafael, Calif., assignor to Chevron Research Company, San Francisco, Calif.
No Drawing. Filed Aug. 5, 1970, Ser. No. 61,409
Int. Cl. C10g 17/00
U.S. Cl. 208—216
9 Claims

ABSTRACT OF THE DISCLOSURE

In a process for hydrotreating heavy oils containing soluble organometallic compounds wherein the heavy oil is contacted, at an elevated temperature and pressure and in the presence of hydrogen, with valuable hydrotreating catalyst solid particles and the hydrotreating catalyst loses activity at least in part due to metals fouling of the catalyst, the improvement which comprises rejuvenating the metals fouled catalyst by attriting away at least a portion of the outside skin of the catalyst particles so as to extend the useful life of the catalyst particles for hydrotreating.

BACKGROUND OF THE INVENTION

The present invention relates to rejuvenation of catalyst particles. More particularly, the present invention relates to the rejuvenation of catalyst particles used for hydrotreating heavy oils and still more particularly, the present invention relates to rejuvenation of catalyst particles fouled by metals during hydrotreating reactions.

It is often desired to hydrotreat high boiling feedstocks to remove or reduce the content of various undesired constituents such as organic sulfur, organic nitrogen, organometallic compounds, asphaltenes, polynuclear aromatic compounds, etc. The term "hydrotreating" is used herein to include hydroprocessing of various hydrocarbon feedstocks at elevated temperature, usually between about 500 and 900° F. and elevated pressure, usually between about 200 and 5,000 p.s.i.g., and wherein the hydrocarbon feedstock is contacted with solid catalyst particles containing at least one hydrogenation component such as a Group VI-B or Group VIII metal component at the elevated temperature and pressure and in the presence of added free hydrogen, usually in an amount ranging from 200 to 10,000 s.c.f. of hydrogen per barrel of oil feed. There is usually at least a minor amount of hydrocracking which occurs during hydrotreating, but the present invention is primarly concerned with the hydrotreating of heavy hydrocarbon feedstocks such as crude oils, deasphalted oils, shale oils, residuum vacuum gas oils, and topped crude oils containing undesired inorganic compounds such as sulfur or nitrogen or metals, whereas processes directed mostly to hydrocracking are primarily concerned with upgrading usually lighter feedstocks containing considerably smaller amounts of sulfur, nitrogen, or metals than the typical feedstocks to hydrotreating processes and, in addition, hydrocracking is usually primarily concerned with producing a final gasoline or jet fuel product. The hydrotreating processes with which the present invention is primarily concerned can also be distinguished from what is commonly called "catalytic cracking" in that catalytic cracking is usually carried out without substantial amounts of added free hydrogen and at higher temperatures, usually in the range of about 900–1100° F. and at lower pressures, usually in the range of atmospheric to 100 p.s.i.g.

In hydrotreating processes, metals present in the feedstocks as organometallic compounds tend to deposit in and on the catalyst particles and these metals can cause a severe deactivation of the catalyst particles, thus limiting the life of the catalyst. Deactivation and consequent limiting of the life of catalyst particles by metals fouling is particularly acute in the case of residuum desulfurization. It is likely that this deactivation is caused by the relatively high concentration of organometallic compounds in residuum feedstocks coupled with the fact that the same catalysts which are active for desulfurization typically are also active for demetalation.

Hydrodesulfurization reactions can be exemplified by the following reaction:

Sulfur conversion to hydrogen sulfide:

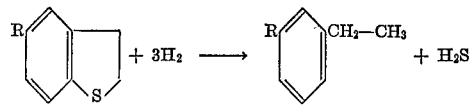

Demetalation reactions can be indicated as follows:
Organometallic Ni, Vn, Fe, Cu, etc.+$H_2$→hydrocarbon+metal adsorbed in and/or on catalyst particles.

The forms the soluble metallic compounds may assume in oils, particularly residual oils, are not known with certainty. One general form for a metallic porphyrin may be represented as follows for iron:

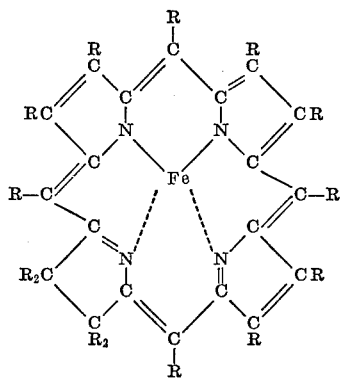

Another type of soluble organometallic compounds found in oils, particularly residual oils, are the metal naphthenates. One general form for the metal naphthenates may be represented as follows for iron:

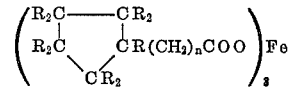

where $n$ may be zero but generally is an integer between 1 and 5, and R is hydrogen or an alkyl group.

During hydrotreating reactions, particularly hydrotreating of heavy hydrocarbon feedstocks containing organometallic compounds, as the catalyst becomes progressively fouled with metals and coke, the activity of the catalyst decreases. Consequently, the temperature at which the hydrotreating reactions are carried out in the hydrotreating reactor must be increased in order to obtain the desired results, for example, to obtain the desired percent desulfurization of the feedstock or to obtain the desired sulfur content in the product from the hydrotreater reactor, in this instance, a desulfurization reactor. When the temperature in the hydrotreater reactor is raised to the limit or design maximum temperature for the particular hydrotreating process, the "life" of the catalyst is expended or the catalyst can be said to be "spent."

In the more common instance of deactivation of catalyst particles by coking, the catalyst can be reactivated by burning coke off of the catalyst particles in a regeneration procedure. However, in the case of deactivation of catalyst particles by metals fouling, the metals, of course, cannot be removed by burning or a simple regeneration procedure. Insead, if the catalyst particles are to be used again, the catalyst particles must be rejuvenated by a method other than coke burning.

Although there have not been a large number of suggested methods for rejuvenating hydrotreating catalyst particles, various methods for rejuvenating catalyst cracking particles have been suggested. Rejuvenation procedures for catalytic cracking catalysts frequently involve contact of the cracking catalyst at elevated temperatures with vapors reactive with the poisoning metal on the catalyst particles.

It has been found, for example, that Ni, Fe, and V may be removed from a cracking catalyst by converting the metals into volatile compounds. A chlorination treatment can convert iron and vanadium to volatile chlorides. Nickel may be converted to the volatile nickel carbonyl by hydrogenation and treatment with carbon monoxide.

Also, U.S. Pat. 3,140,923 discloses a mechanical apparatus for removing metals from catalytic cracking catalyst utilizing a chlorination procedure in the apparatus. As disclosed in U.S. Pat. 2,382,755, inorganic material such as metals in the feed to catalytic cracking units does "permanent harm" to the cracking catalyst. Thus, rather involved procedures such as disclosed in U.S. Pat. 3,140,923 have been suggested for use in attempting to remove metals from catalytic cracking catalyst particles and reduce the deleterious effect of the metals remaining in and on the cracking catalyst. U.S. Pat. 3,409,541 discloses a method directed toward keeping metals present as organometallic compounds in the cracking unit feedstock from forming deposits on the cracking catalyst and also directed to preventing the cracking catalyst from retaining metallic deposits. According to the process disclosed in U.S. Pat. 3,409,541, minimizing the metal deposits is accomplished by introducing into the circulating fluidized catalyst a finely divided material. It is theorized in U.S. Pat. 3,409,541 that the added material is effective because it promotes the sintering of the metals from the contaminants into an inactive form.

U.S. Pat. 2,856,367, titled "Method for Removing Peripheral Material from Porous Solids" discloses a method for removing surface material from porous solids by bringing the porous solid from which it is desired to remove peripheral material into contact with a molten wax so that the molten wax penetrates into the pores of the solid to at least a depth corresponding to the depth of peripheral material to be removed. The porous solid is then removed from contact with the molten wax. The wax contained in the pores of the solid is allowed to solidify and the solid containing the solidified wax is contacted with a wax solvent for a period of time sufficient to dissolve wax from the pores of the solid to the depth of peripheral material to be removed. The solid, after such exposure to the solvent, is contacted with a polar liquid. The solid is then dried.

U.S. Pat. 3,197,416, titled "Process for Removing Metallic Contaminants from Hydrocarbon Cracking Catalyst," discloses a process wherein metallic contaminants are removed from a hydrocarbon cracking catalyst by intimately contacting the catalyst with a mixture of anionic and cationic ion exchange resins consisting of from about 2% to 85% by weight of the anionic resin, and the balance essentially the cationic resin.

As indicated previously, although various methods have been disclosed for rejuvenating catalytic cracking catalyst particles, there have been considerably fewer proposed methods for rejuvenating hydrotreating or hydrofining catalyst particles. However, U.S. Pat. 3,451,942 discloses one method for rejuvenating a hydroconversion catalyst which method comprises converting or contacting the deactivated catalyst with nitric acid, then oxygen, and then hydrogen.

SUMMARY OF THE INVENTION

According to the present invention, in a process for hydrotreating heavy oils containing soluble organometallic compounds wherein the heavy oil is contacted at an elevated temperature and pressure and in the presence of hydrogen with valuable hydrotreating catalyst solid particles and the hydrotreating catalyst loses activity at least in part due to metals fouling of the catalyst, the improvement is made which comprises rejuvenating the metals fouled catalyst by attriting away at least a portion of the outside skin of the catalyst particles so as to extend the useful life of the catalyst particles for hydrotreating.

The hydrotreating process of the present invention is usually carried out in a vessel typically referred to as a reactor. In carrying out the present invention, preferably at least a portion of the metal fouled hydrotreating catalyst particles is removed from the reactor and rejuvenated by grinding away at least a portion of the outside skin of the particles so that the catalyst particles regain at least 50 percent of their initial hydrotreating activity.

The present invention is based partly on our unexpected finding that by attriting away a relatively small portion of the outside surface of metal fouled hydrotreating catalysts, a very substantial regain of the catalyst intitial activity is usually achieved. The hydrotreating catalyst particles which are rejuvenated in accordance with the process of the present invention are preferably used for further hydrotreating of heavy oils containing soluble organometallic compounds. Thus, the process of the present invention provides a means for obtaining substantially greater use of valuable hydrotreating catalyst particles without substantial loss in the amount of catalyst particles removed from the previous hydrotreating service.

It has been found that the process of the present invention is particularly advantageously applied to hydrotreating catalysts which have been used in fixed catalyst beds operating, for example, at a liquid hourly space velocity (LHSV) between about 0.1 and 5.0. The fixed beds of hydrotreating catalysts are, of course, held essentially immobile in the hydrotreating reactor and thus are not circulated as is the case with cracking catalysts in catalytic cracking processes. Although the present invention was surprisingly found to nearly completely restore the activity of spent hydrotreating catalyst particles used in fixed catalyst beds for processing residua containing more than about 20 p.p.m. metals, the method of the present invention can also be applied to some fluidized hydrotreating catalyst particles. However, the method usually is of less advantage with the hydrotreating catalyst used in fluidized or ebullated bed hydrotreating service because these catalyst particles are of relatively small sizes. Thus, an important aspect of the present invention is our finding that the attrition rejuvenating of fixed bed hydrotreating catalysts having a size greater than a Tyler mesh size of about 14 (fluidized and ebullated bed hydrotreating catalyst particles usually have a Tyler mesh size of about 24 and cracking catalyst is still smaller).

Usually, only between 1–20 weight percent of the catalyst particle is attrited from the catalyst particles as fines in the rejuvenation process according to the present invention and preferably, less than 10 weight percent of the catalyst particle is ground away or otherwise attrited from the outside of the catalyst particles in the rejuvenation process of the present invention.

The term "attriting" is used in the present specification to mean a wearing away of or rubbing away of an outside portion of the catalyst particles by friction against another surface such as other catalyst particles or added abrasive materials such as alundum particles. The term the outside "skin" of the catalyst particles is used herein to connote the outer portion of the catalyst particles in a sense similar to an orange peeling which forms the outer portion or covering of an orange.

Consonant with the terminology "the outside skin of the catalyst particle," we have determined that the present invention is particularly advantageously applied to catalysts with relatively small pore sizes for which catalysts the metals forming material accumulates primarily on an outside "skin" of the catalyst particles.

By electron microprobe analyses and also by microphotographs of catalyst particles, we have found that the metals tend to deposit at the outside periphery of catalyst particles rather than penetrating deeply into the inner pore structure of the catalyst particles. In the case of relatively small-pored catalyst particles, as opposed to catalyst particles having a large number of macropores (pores greater than 500 A. in diameter), the deposition of metals from organometallic compounds during hydrotreating reactions is particularly concentrated in the outermost portions of the catalyst particles. Thus, it is believed that the present invention is particularly effective for catalyst particles having a large amount of relatively small pore sizes because in these catalysts, the metals from organometallic compounds in the feedstocks are particularly apt to deposit in an outer skin of the catalyst particles whereas with the catalyst particles having a relatively large amount of large pores, the metal deposition is likely to penetrate relatively deeply into the catalyst particles and thus, be less readily removed by the rejuvenation process of the present invention.

Catalysts having small pore sizes are often prepared by cogellation or coprecipitation procedures as opposed to impregnation preparation procedures wherein the hydrogenation component is impregnated, for example, onto an alumina or silica-alumina support. In any case, we have determined that the process of the present invention is particularly advantageously applied to catalyst particles prepared by cogellation. Thus, according to a preferred embodiment of the present invention, the catalyst particles which are rejuvenated have at least 50 percent of their pore volume in pores less than 60 A. in radius and preferably, the catalyst particles are prepared by cogellation of at least one hydrogenation component with a compound of an element selected from the group of elements consisting of silicon, aluminum, magnesium and zirconium.

Although it is preferred to apply the process of the present invention to the rejuvenation of hydrotreating catalysts, the process of the present invention can also be applied to the rejuvenation of hydrocracking catalysts. Hydrotreating catalysts are particularly preferred for treatment according to the process of the present invention because in hydrotreating, there is more frequently a relatively high parts per million content of organometallic compounds in the feedstocks. However, in many instances, hydrotreating and hydrocracking are carried out concurrently and it is difficult to characterize the reaction as being primarily of hydrotreating nature or primarily of a hydrocracking nature.

In the case of either hydrotreating or hydrocracking, the catalyst particles used usually comprise at least one hydrogenation component selected from Group VI-B and Group VIII metal components (usually the metal is present in the finished catalyst as an oxide or sulfide, but it may be present in elemental form) and at least one compound selected from the group consisting of silica, alumina, magnesia, and zirconia. In the case of hydrotreating catalysts, frequently both a Group VI-B and a Group VIII metal component are used together with an inorganic refractory support or base material such as silica or silica-alumina. In the case of hydrocracking catalysts, frequently only a Group VI-B component is used with the inorganic refractory support or base material. It is, of course, to be understood that in addition to the above-specified components, various other components can be present in the hydrotreating or hydrocracking catalyst particles rejuvenated according to the process of the present invention.

The attrition or removal of the outside portion of the metals fouled catalyst according to the process of the present invention is preferably effected at least in part by tumbling the catalyst particles in a mechanical tumbling apparatus. In order to carry out the attrition or removal of an outside portion of the metals fouled catalyst particles, the catalyst particles preferably are withdrawn (continuously or intermittently) from the hydrotreating reaction vessel and then subjected to attrition as, for example, in a mechanical tumbling apparatus. Various rotating mechanical apparatuses can be used to effect the grinding away or otherwise attriting away of the outside surface of the catalyst particles as fines which are subsequently separated from the larger catalyst particles which are to be re-used after the rejuvenation procedure.

The fines which are separated from the catalyst particles are separated on a relative size basis compared to the size of the initial catalyst subjected to the rejuvenation procedure. Usually, the catalyst particles which are rejuvenated according to the process of the present invention are pellets or spheres having a size such as 1/8 inch diameter by 1/4–3/8 inch length and the fines separated from the catalyst preferably have a Tyler mesh size less than about 35 mesh size. In general, the catalyst particles treated according to the process of the present invention are substantially larger than catalytic cracking catalysts and will typically have a size greater than about 32 Tyler mesh size whereas the fines separated from the rejuvenated catalyst particles usually will have a size greater than about 42 Tyler mesh size.

Heavy oils which are particularly preferred for treatment in the process of the present invention are oils usually boiling above about 600 or 650° F. or oils having at least about 10 or 20 weight percent material boiling above 850° F. These heavier oils have a relatively large amount of organometallic compounds dissolved in the oil. Particular classes of feedstocks include whole crude oil, atmospheric crude oil distillation bottoms, heavy vacuum gas oils, vacuum crude oil distillation bottoms and solvent deasphalted vacuum distillation bottoms.

Although the process of the present invention can be applied to a wide variety of hydroprocessing and particularly hydrotreating processes, preferably the process of the present invention is used to rejuvenate metals fouled catalysts from a hydrodesulfurization process.

Thus, according to a particularly preferred embodiment of the present invention, in a process for hydrodesulfurization of residuum oil containing between 3 and 1,000 p.p.m. of soluble organometallic compounds wherein the residuum is fed to a reactor and therein is contacted, at a temperature between 500 and 900° F., a pressure between 200 and 5,000 p.s.i.g., and a hydrogen gas feed rate to the reactor between 200 and 10,000 s.c.f. of hydrogen per barrel of residuum feed to the reactor, with catalyst particles comprising a hydrogenation component selected from the group consisting of Group VI-B and VIII metal components and mixtures thereof and an inorganic refractory oxide selected from the group consisting of alumina, silica, magnesia and zirconia and mixtures thereof, and the catalyst particles lose activity for hydrodesulfurization at least in part due to metals fouling of the catalyst particles by the organometallic compounds, the improvement is made which comprises removing at least a portion of the metals fouled catalyst from the reactor, rejuvenating the metals fouled catalyst by tumbling the metals fouled catalyst in a mechanical tumbling apparatus preferably in the presence of an added abrasive material until between about 2 and 15 weight percent of the metals fouled catalyst is broken from the metals fouled catalyst as fines smaller than 35 mesh, removing the fines from the tumbled catalyst particles, and reusing the tumbled catalyst particles for hydrodesulfurization of a residuum containing organometallic compound.

EXAMPLE AND FURTHER DESCRIPTION

Spent catalysts for rejuvenation according to the process of the present invention were obtained from two runs carried out under reaction conditions as tabulated in Table I below.

TABLE I

|  | Run No. 1 | Continuation of Run No.— | |
|---|---|---|---|
|  |  | 1 | 2 |
| Catalyst | A | A | A |
| Particle size (Tyler mesh size) | 8–16 | 8–16 | 10–16 |
| Feed | (¹) | (²) | (²) |
| Metals content: |  |  |  |
| Ni, p.p.m. | 8 | 25 | 25 |
| V, p.p.m. | 27 | 77 | 77 |
| LHSV | 1.2 | 1.0 | 1.0 |
| Product sulfur (wt. percent) | 0.5 | 1.0 | 1.0 |
| Run, hours | 0–400 | 400–1,600 | 0–2,500 |
| Start of run temperature (° F.) | 730 | 730 | 720 |
| End of run temperature (° F.) | 790 | 800 | 800 |
| Pressure (p.s.i.g.) | 1,400 | 1,900 | 1,900 |
| Type of run | (³) | (³) | (⁴) |

¹ Arab. Lt. Residuum.
² Safaniya Residuum.
³ Single bed of Catalyst A.
⁴ Catalyst A in second bed of two-catalyst, two bed system.

The spent catalyst for rejuvenation according to the process of the present invention was obtained from two runs in order to have a sufficiently large amount of catalyst for reuse and for sending out for various analyses on the catalyst particles. The first run was started on Arabian Light residuum having 3 weight percent sulfur. The catalyst had a start of run temperature or activity of 730° F. to effect the desulfurization down to a product organic sulfur level (calcinated as weight percent sulfur) of 0.5%. The hydrotreating catalyst particles were used in a fixed catalyst bed at a liquid hourly space velocity (LHSV) of 1.2 for 400 hours after which time the feed was switched to Safaniya residuum and the pressure was increased from 1400 to 1900 p.s.i.g. and the sulfur was reduced from a level of 4.3 weight percent to 1.0 weight percent. This run was completed after 1600 hours of on-stream time with the catalyst having an end of run activity of 800° F., i.e., at end of run, the required temperature of reaction in contact with the catalyst was 800° F. in order to obtain the desired sulfur level for the product of 1.0 weight percent.

A second run was carried out on Safaniya residuum for a longer period of time using a multi-stage processing scheme with a bed of catalyst particles effective to remove some of the organometallic compounds ahead of the bed of catalyst particles to be rejuvenated according to the process of the present invention. Removing part of the organometallic compounds ahead of the main desulfurization catalyst particles (the second bed of particles) substantially increased the run length for the difficult job of desulfurizing Safaniya residuum but in addition to coking of the main desulfurization catalyst particles, the main desulfurization particles were also limited in life by metals fouling due to an appreciable amount of organometallic compounds passing through the first bed of catalyst particles. After 2500 hours of operation, the main bed of desulfurization catalyst particles had an activity of 800° F. for a product sulfur content of 1.0 weight percent. The catalyst particles from runs 1 and 2 were then rejuvenated by attriting away about 5 percent by weight of the outside skin of the catalyst particles as fines less than 35 Tyler mesh size. The rejuvenated catalyst was then tested under the following conditions: Safaniya Residuum Feedstock, 1.0 LHSV, 1.0 weight percent product sulfur, 1900 p.s.i.g.

The initial or start of run activity was about 730° F. which indicates a surprisingly high recovery of activity (about 70° F. recovery, and approximately the same initial activity as the catalyst initially used, i.e., the catalyst particles before any metals fouling). Although the fouling rate of the rejuvenated catalyst was found to be somewhat higher than that of the fresh catalyst, the regain in activity of the catalyst was sufficiently great to make the reuse of the catalyst economically attractive.

The particular rejuvenation steps used to rejuvenate the spent catalyst from runs 1 and 2 was primarily a grinding away of the outside skin of the catalyst particles by tumbling the catalyst particles in an attrition tester. Specifically, the catalyst particles were tumbled in an attrition tester for ½ hour to result in the attrition of 2.00 weight percent of the catalyst particles as fines smaller than 35 Tyler mesh. The catalyst particles were then divided into two groups, X and Y. The X group was retained for subsequent work. The Y group was further attrited by tumbling in the attrition tester for an additional ½ hour resulting in the attriting away of 0.367 weight percent as catalyst fines. The Y group catalyst particles were then mixed with an equal volume of abrasive alundum (45 mesh) and tumbled in the attrition tester for another 5 hours resulting in 3.18 weight percent of fines based on the Y sample. The total amount of material removed from the spent catalyst as fines was 5.54 weight percent. The catalyst was then tested for desulfurization activity with the results as previously indicated.

As indicated previously, the rejuvenation procedure of the present invention is particularly advantageously applied to catalysts prepared by cogellation and to catalysts having a relatively large amount of small pores instead of a predominant amount of macropores. Preferably, the catalyst will have at least 50 percent of its pore volume in micropores defined as pores having a pore radius of 85 A. or less and more preferably, at least 50 percent of its pore volume in micropores defined as pores having a pore radius of 60 A. or less.

The particular catalyst which was used in runs 1 and 2 above and then rejuvenated was prepared by cogellation of nickel and aluminum chlorides and sodium molybdate. The particular catalyst used in the above example had a mean pore diameter of 112 A. by the nitrogen adsorption method. Fifty percent of the pore volume was below 112 A. The toal pore volume was 0.66 ml./g. and the surface area was 261 m.²/g.

Hydrotreating catalysts such as the above catalysts are described in more detail in U.S. Pat. 3,493,517, the disclosure of which patent is incorporated by reference into the present patent application.

Although various embodiments of the invention have been described, it is to be understood that they are meant to be illustrative only and not limiting. Certain features may be changed without departing from the spirit or scope of the present invention. It is apparent that the present invention has broad application to the rejuvenation of catalyst particles by attriting away at least a portion of the outside skin of various types of hydroprocessing catalysts fouled by deposited metals. Accordingly, the invention is not to be construed as limited to the specific embodiments or examples discussed but only as defined in the appended claims.

I claim:

1. In a process for hydrotreating a heavy oil boiling above about 600° F. and selected from the class consisting of whole crude oil, atmospheric crude oil distillation bottoms, heavy vacuum gas oils, vacuum crude oil distillation bottoms, and solvent deasphalted vacuum distillation bottoms containing soluble organometallic compounds wherein the heavy oil is contacted, at an elevated temperature and pressure and in the presence of hydrogen, with valuable hydrotreating catalyst solid particles, said particles containing at least one hydrogenation component selected from the class consisting of Group VI–B and Group VIII metals, which lose catalytic activity at least in part due to metals fouling of the catalyst, the improvement which comprises rejuvenating the metals-fouled catalyst by attriting at least a portion of the outside skin of the catalyst particles so as to extend the useful life of the catalyst particles for hydrotreating.

2. A process in accordance with claim 1 wherein the hydrotreating reaction is carried out in a reactor and at least a portion of the metals fouled catalyst particles is removed from the reactor and rejuvenated by grinding away at least a portion of the outside skin of the particles so that the catalyst particles regain at least 50 percent of their initial hydrotreating activity.

3. A process in accordance with claim 2 wherein the rejuvenated catalyst particles are used for further hydrotreating of heavy oil containing soluble organometallic compounds.

4. A process in accordance with claim 2 wherein between 1 and 20 weight percent of the catalyst particle is ground away and removed from the catalyst particles as fines.

5. A process in accordance with claim 2 wherein the catalyst particles comprise at least one hydrogenation component selected from Group VI-B and VIII metal and at least one compound selected from the group consisting of silica, alumina, magnesia and zirconia and wherein the catalyst has at least 50 percent of its pore volume in pores less than 60 A. in radius and wherein the catalyst particles are prepared by cogellation of at least one hydrogenation component with a compound of an element selected from the group consisting of silicon, aluminum, magnesium and zirconium.

6. A process in accordance with claim 2 wherein the rejuvenation is effected at least in part by tumbling the catalyst particles in a mechanical tumbling apparatus.

7. A process in accordance with claim 2 wherein the heavy oil is selected from the group consisting of whole crude oil, atmospheric crude oil distillation bottoms, heavy vacuum gas oils, vacuum crude oil distillation bottoms, and solvent deasphalted vacuum distillation bottoms.

8. A process in accordance with claim 7 wherein the hydrotreating process is a hydrodesulfurization process.

9. In a process for hydrodesulfurization of residuum oil containing between 3 and 1000 p.p.m. of soluble organometallic compounds wherein the residuum is fed to a reactor and therein is contacted, at a temperature between 500 and 900° F., a pressure between 200 and 5000 p.s.i.g., and a hydrogen gas feed rate to the reactor between 200 and 10,000 s.c.f. of hydrogen per barrel of residuum feed to the reactor, with catalyst particles comprising a hydrogenation component selected from the group consisting of Group VI-B and VIII metal components and mixtures thereof and an inorganic refractory oxide selected from the group consisting of alumina, silica, magnesia and zirconia and mixtures thereof, and the catalyst particles lose activity for hydrodesulfurization at least in part due to metals fouling of the catalyst particles by the organometallic compounds, the improvement which comprises removing at least a portion of the metals fouled catalyst from the reactor, rejuvenating the metals fouled catalyst by tumbling the metals fouled catalyst in a mechanical tumbling apparatus until between about 2 and 15 weight percent of the metals fouled catalyst is broken from the metals fouled catalyst as fines smaller than 35 mesh, removing the fines from the tumbled catalyst particles, and reusing the tumbled catalyst particles for hydrodesulfurization of residuum containing organometallic compounds.

References Cited
UNITED STATES PATENTS

| | | | |
|---|---|---|---|
| 3,232,861 | 2/1966 | Gorin et al. | 208—10 |
| 1,412,219 | 4/1922 | Richardson | 252—411 |
| 2,605,234 | 6/1952 | Friedman | 252—411 |
| 3,160,998 | 12/1964 | Payne | 252—411 |
| 2,602,771 | 7/1952 | Mynday et al. | 252—411 |
| 3,383,301 | 5/1968 | Beuther et al. | 208—216 |
| 2,382,755 | 8/1945 | Tyson | 208—55 |
| 3,409,541 | 11/1968 | Flanders et al. | 208—120 |
| 3,451,942 | 6/1969 | Bertolacini | 252—411 |
| 3,262,874 | 7/1966 | Gatsis | 208—216 |
| 3,294,659 | 12/1966 | O'Hara | 208—216 |
| 3,562,150 | 2/1971 | Hamilton et al. | 208—216 |

FOREIGN PATENTS

| | | | |
|---|---|---|---|
| 865,490 | 4/1961 | Great Britain | 252—411 |

DELBERT E. GANTZ, Primary Examiner

J. M. NELSON, Assistant Examiner

U.S. Cl. X.R.

208—251 H; 252—411

PO-1050
(5/69)

UNITED STATES PATENT OFFICE
CERTIFICATE OF CORRECTION

Patent No. 3,761,400          Dated September 25, 1973

Inventor(s) David S. Mitchell

It is certified that error appears in the above-identified patent and that said Letters Patent are hereby corrected as shown below:

Col. 4, line 55, "attrition rejuvenating" should read
--attrition rejuvenation procedure is particularly advantageously applied to rejuvenating--.

Col. 7, line 35, "(calcinated as" should read -- (calculated as --.

Signed and sealed this 21st day of May 1974.

(SEAL)
Attest:

EDWARD M. FLETCHER, JR.
Attesting Officer

C. MARSHALL DANN
Commissioner of Patents